United States Patent
Ruszkowski, Jr.

(10) Patent No.: US 6,674,391 B2
(45) Date of Patent: Jan. 6, 2004

(54) SYSTEM AND METHOD OF SIMULATED IMAGE RECONSTRUCTION

(75) Inventor: Robert A. Ruszkowski, Jr., Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/141,321

(22) Filed: May 8, 2002

(65) Prior Publication Data

US 2003/0210168 A1 Nov. 13, 2003

(51) Int. Cl.[7] .............................................. G01S 13/90
(52) U.S. Cl. .............................. 342/25; 342/52; 342/57; 342/58; 342/64; 342/169; 342/189; 342/191; 342/195
(58) Field of Search ............................. 342/25, 52, 57, 342/58, 64, 169, 189, 190, 191, 195, 197; 345/619, 629, 633; 434/2

(56) References Cited

U.S. PATENT DOCUMENTS

| | | | |
|---|---|---|---|
| 4,017,985 A | * 4/1977 | Heartz | 434/2 |
| 4,168,582 A | * 9/1979 | Heidrich | 434/2 |
| 4,702,698 A | * 10/1987 | Beckwith et al. | 434/2 |
| 4,780,084 A | * 10/1988 | Donovan | 434/2 |
| 4,952,922 A | 8/1990 | Griffin et al. | 340/729 |
| 5,192,208 A | 3/1993 | Ferguson et al. | 434/12 |
| 5,355,325 A | * 10/1994 | Uhlmann | 342/189 |
| 5,479,597 A | * 12/1995 | Fellous | 715/500.1 |
| 5,680,138 A | * 10/1997 | Pritt | 342/169 |
| 6,061,068 A | 5/2000 | Hoffman, II et al. | 345/433 |
| 6,075,480 A | * 6/2000 | Deliberis, Jr. | 342/169 |
| 6,128,019 A | 10/2000 | Crocker, III et al. | 345/419 |
| 6,166,744 A | 12/2000 | Jaszlics et al. | 345/419 |
| 6,196,845 B1 | 3/2001 | Streid | 434/44 |
| 2003/0076254 A1 | * 4/2003 | Witten | 342/22 |

OTHER PUBLICATIONS

Boninsegna, M. et al., "A Tunable Algorithm to Update a Reference Image," Signal Processing Image Communication, Elsevier Science Publishers, vol. 16, No. 4, Nov. 2000, pp. 353–365.

Redmill, Keith A. et al., "Sensor and Data Fusion Design and Evaluation with a Virtual Environment Simulator," Proceedings of the Institute of Electrical & Electronics Engineers' Intelligent Vehicles Symposium, 2000, held in Dearborn, Michigan on Oct. 3–5, 2000, pp. 668–674.

Kim, Shih–Chieh et al., "Hierarchical Delta Modulation for Compression of Surveillance Video Systems," Digest of Technical Papers of the International Conference on Consumerelectronics (ICCE) held on Jun. 21–23, 1994, published on Jun. 21, 1994, pp. 148–149.

World Wide Web, http://www.fas.org/irp/program/disseminate/senior$_{13}$span.htm, Federation of American Scientists Intelligence Resource Program, "Senior Span," printed Apr. 3, 2002, 1 pg.

Primary Examiner—John B. Sotomayor
(74) Attorney, Agent, or Firm—Wei Wei Jeang; Munsch Hardt Kopf & Harr, P.C.

(57) ABSTRACT

A system includes a storage medium storing contextual information about a target or target area, and a simulator communicatively coupled to the storage medium and operable to receive the contextual information. The simulator is operable to generate a set of simulated information about the target using the contextual information. The system further includes a sensor operable to collect a set of actual information about the target. A comparator is operable to generate a set of delta information in response to differences between the set of simulated information and the set of actual information. The delta information is transmitted and added to a second set of simulated information to generate a set of information that is substantially similar to the set of actual information.

38 Claims, 3 Drawing Sheets

OTHER PUBLICATIONS

World Wide Web, http://www.fas.org/irp/program/disseminate/senior_13spur.htm, Federation of American Scientists Intelligence Resource Program, "Senior Spur," printed Apr. 3, 2002, 1 pg.

World Wide Web, http://www.fas.org/irp/agency/daro/uav97/page23.html, Federation of American Scientists Intelligence Resource Program, "Unmanned Aerial Vehicle Annual Report FY 1997," printed Apr. 3, 2002, 2 pgs.

World Wide Web, http://www.jitc.fhu.disa.mil/sdl/overview.html, "Joint Interoperability Test Command, Common Data Link Overview," printed on Apr. 3, 2002, 3 pages.

World Wide Web, http://jitc.fhu.disa.mil/cdl/desc.html, "Joint Interoperability Test Command, Common Data Link Description," printed on Apr. 3, 2002, 2 pages.

World Wide Web, http://www.multigen-paradigm.com/support/radarworks.html, Photon Research Associates, Inc., Chris Blasband, et al., "Physics Based Radar Simulation," printed on Sep. 11, 2002, 15 pages.

World Wide Web, http://www.cg2.com/products/viXsen/viXsen_main.htm, CG2, Inc., Vixsen, "Physics–based Dynamic Sensor Simulation," printed on Mar. 26, 2002, 1 page.

World Wide Web, http://www.cg2.com/products/Mantis/mantis_main.htm, CG2, Inc., Mantis, "Redefining Image Generation," printed on Mar. 26, 2002, 1 page.

World Wide web, http://www.cg2.com/products/viXsen/viXsenPrep.htm, CG2, Inc., Vixsen, "viXsenPrep," printed on Mar. 26, 2002, 1 page.

World Wide Web, http://www.photon.com/pra/pra.html, Photon Research Associates, Inc., "GCI Toolkit," printed on Mar. 26, 2002, 5 pages.

World Wide Web, http://www.vis-sim.org/db.asp?cat_13ref=200, VIS-SIM.ORG, "Resource Database", printed on Mar. 26, 2002, 1 page.

World Wide Web, http://www.cg2.com/products/products_main.htm, CG2, Inc., "Products Available from CG2, Inc." printed Apr. 5, 2002, 1 page.

Greg Jaffe, Busy Signals: Modern Warfare Strains Capacity to Communicate, The Wall Street Journal, Apr. 10, 2002, 4 pages.

* cited by examiner

SYSTEM AND METHOD OF SIMULATED IMAGE RECONSTRUCTION

TECHNICAL FIELD OF THE INVENTION

The present invention relates generally to the field of imaging and in particular to a system and method of simulated image reconstruction as a means of reducing transmission bandwidth demands.

BACKGROUND OF THE INVENTION

Intelligence gathering platforms such as manned and unmanned aircraft and satellites are utilized to collect images of terrain and manmade features (e.g., structures, vehicles, etc.) on the Earth's surface. Synthetic aperture radar, electro-optical sensor, infrared sensor, real beam ground map, doppler beam sharpening, or another imaging technique now known and later developed is typically used to generate frames of imagery of areas of interest that include specific targets that may be arrayed therein. To be useful for reconnaissance and surveillance purposes, high-resolution images are typically required. The captured high-resolution images are typically transmitted from the platform to a surface-based station via a communication data link either directly via line-of-sight transmission or indirectly via satellite. Because of the volume of data associated with high-resolution images and the limited availability of data link bandwidth that is typically shared with other users and applications, the image transmission usually requires a relatively large time window and can dominate the bandwidth of a given data link. In some instances, such dominance of the available bandwidth impedes the transmission of other critical data to an unacceptable degree.

SUMMARY OF THE INVENTION

A need has arisen to solve the high bandwidth demand and long transmission time problems associated with communicating high-resolution images (e.g., for reconnaissance or surveillance purposes) and related information from airborne or space-based platforms to a surface-based station.

In accordance with an embodiment of the present invention, a system includes a storage medium storing contextual information about a target, and a simulator communicatively coupled to the storage medium and operable to receive the contextual information. The simulator is operable to generate a set of simulated information about the target using the contextual information. The system further includes a sensor operable to collect a set of actual information about the target. A comparator is operable to generate a set of delta information in response to a difference between the set of simulated information and the set of actual information.

In accordance with another embodiment of the invention, an imaging system includes an imaging sensor on board a moving platform and is operable to generate an actual image of a target area, a storage medium on board the moving platform that stores contextual information about the target area both natural and manmade, and at least one current conditions sensor operable to determine at least one measurement of current conditions of the moving platform and the imaging sensor. A physics-based imaging sensor simulator on board the moving platform is communicatively coupled to the storage medium and the at least one current conditions sensor and is operable to generate a simulated image of the target area using the contextual information and the at least one current condition measurement. A comparator is operable to generate image deltas in response to a difference between the simulated image and the actual image.

The system further comprises a communications link transmitting the set of delta information (i.e., image deltas) and current conditions of the moving platform and the operable imaging sensor (recorded at the time of actual information collection) to a base station. A second physics-based sensor performance simulator at the remote location is communicatively coupled to a second storage medium and is operable to receive contextual information about the target area, and is operable to generate a second simulated image of the target area. An adder is operable to add the set of received delta information (i.e., image deltas) to the second simulated image and generate a set of reconstructed information substantially similar to the set of actual information (i.e., the actual image).

In accordance with another embodiment of the present invention, a method includes the steps of capturing a current image of a target area, comparing the current image with a previous image of that same target area, generating an image delta of the target area in response to the comparison, transmitting the image delta to a remote location, and adding the image delta to the previously received or reconstructed image of the target area, and generating a simulated current image of the target area at the remote location.

The method further includes the steps of collecting current information about the target area, comparing the current information with previous information about the target area, generating delta information about the target area, transmitting the delta information about the target area to a remote location, and then adding the delta information to previous information about the target area and generating simulated current information about the target area at the remote location.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Figure 1:
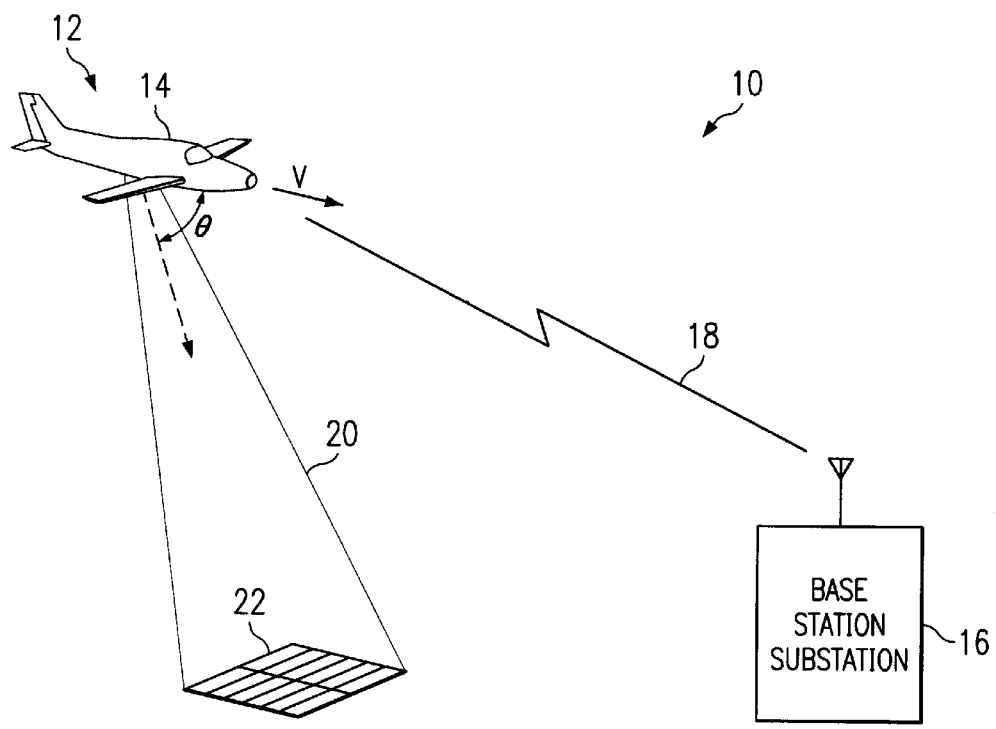
FIG. 1 is a simplified block diagram of an embodiment of system and method of simulated image reconstruction according to the teachings of the present invention.

FIG. 1 is a simplified diagram of an embodiment of system and method of synthesized image reconstruction 10 according to the teachings of the present invention. System 10 includes a platform-based subsystem 12 on board a moving imaging platform 14 such as an aircraft or a satellite and a remote base station subsystem 16. Remote base station subsystem 16 is not necessarily stationary or located on land, but is a base station that is designated to receive the reconnaissance or surveillance information (e.g., imagery) from platform 14. For example, base station subsystem 16 may be in a building, a land vehicle, an aircraft carrier, or even in another aircraft. Platform-based subsystem 12 communicates with base station subsystem 16 via a communications link 18. Communications link 18 is typically bi-directional for sending and receiving data and/or commands to and from platform 14. Communications link 18 may be, for example, the satellite Common Data Link (CDL) referred to as SENIOR SPAN or SENIOR SPUR satellite communication systems on the U-2 reconnaissance plane, or the Tactical Common Data Link By (TCDL) using point-to-point or line-of-sight (LOS) transmissions. Communications link 18 typically carries traffic of multiple users and platforms, which makes the high bandwidth requirements of intelligence-quality image transmission a critical issue.

Platform-based subsystem 12 uses an imaging sensor such as synthetic aperture radar, electro-optical sensor, infrared sensor, real beam ground map, doppler beam sharpening, or another imaging technique now known or later developed to scan 20 a particular area of interest 22 on the Earth's surface. Area of interest or target area 22 may include terrain and manmade features such as roads, runways, bridges, canals, buildings, military installations, vehicles, ships, etc. One or more images of target area 22 are then captured using a specific imaging sensor. The position and orientation of the moving platform and the imaging sensor, such as the GPS (Global Positioning System) measurements, velocity vector (v), azimuth angle (not shown) and elevation angle ($\theta$) of the sensor bore sight, pitch and roll angles of the platform, etc. are measured on-board the platform at the same time of actual image formation and used in the preferred image processing and synthetic reconstruction methodology of the present invention as described in more detail below.

Figure 2:
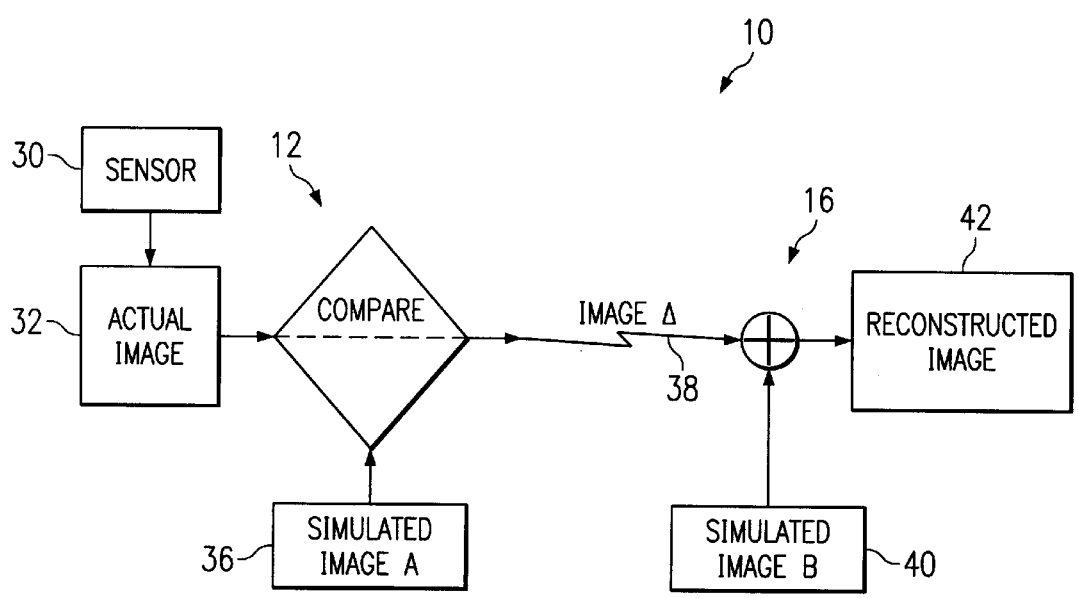
FIG. 2 is a flow diagram of an embodiment of the system and method of simulated image reconstruction according to the teachings of the present invention.

FIG. 2 is a flow diagram of an embodiment of system and method of synthesized image reconstruction 10 according to the teachings of the present invention. System and method 10 includes platform-based subsystem 12 in communications with base station subsystem 16 (e.g., ground station). As described above, platform-based subsystem 12 is on-board moving platform 14 that uses an imaging sensor 30 to capture one or more images 32 of a target area 22. Imaging sensor 30 may be synthetic aperture radar, electro-optical sensor, infrared sensor, real beam ground map, doppler beam sharpening, hyperspectral or another imaging technique now known and later developed. This actual image 32 is compared with a simulated image A 36 generated on board platform 14. Simulated image A 36 is a simulated image given the location of platform 14, the contextual information of target area 22, including previously known terrain/environmental and manmade features of the target area, time-of-day, operable sensor performance parameters and other pertinent data. The comparison yields image "deltas" 38 that includes the differences in the pixel data between actual image 32 and simulated image A 36. The image deltas 38 and other data (e.g., platform location and velocity, on-board imaging sensor orientation, etc.) are transmitted to base station subsystem 16. At base station subsystem 16, image deltas 38 are "added" to a duplicate simulated image B 40 generated at base station subsystem 16. Because simulated image B 40 is identical or very similar to simulated image A 36, a reconstructed image 42 resulting from combining the image deltas 38 and simulated image B 40 is identical or very similar to actual image 32. Using the above-described system and method, only a small subset of image pixel data is transmitted from platform 14 to the base station so that bandwidth and transmit time limitations are minimized.

Figure 3:
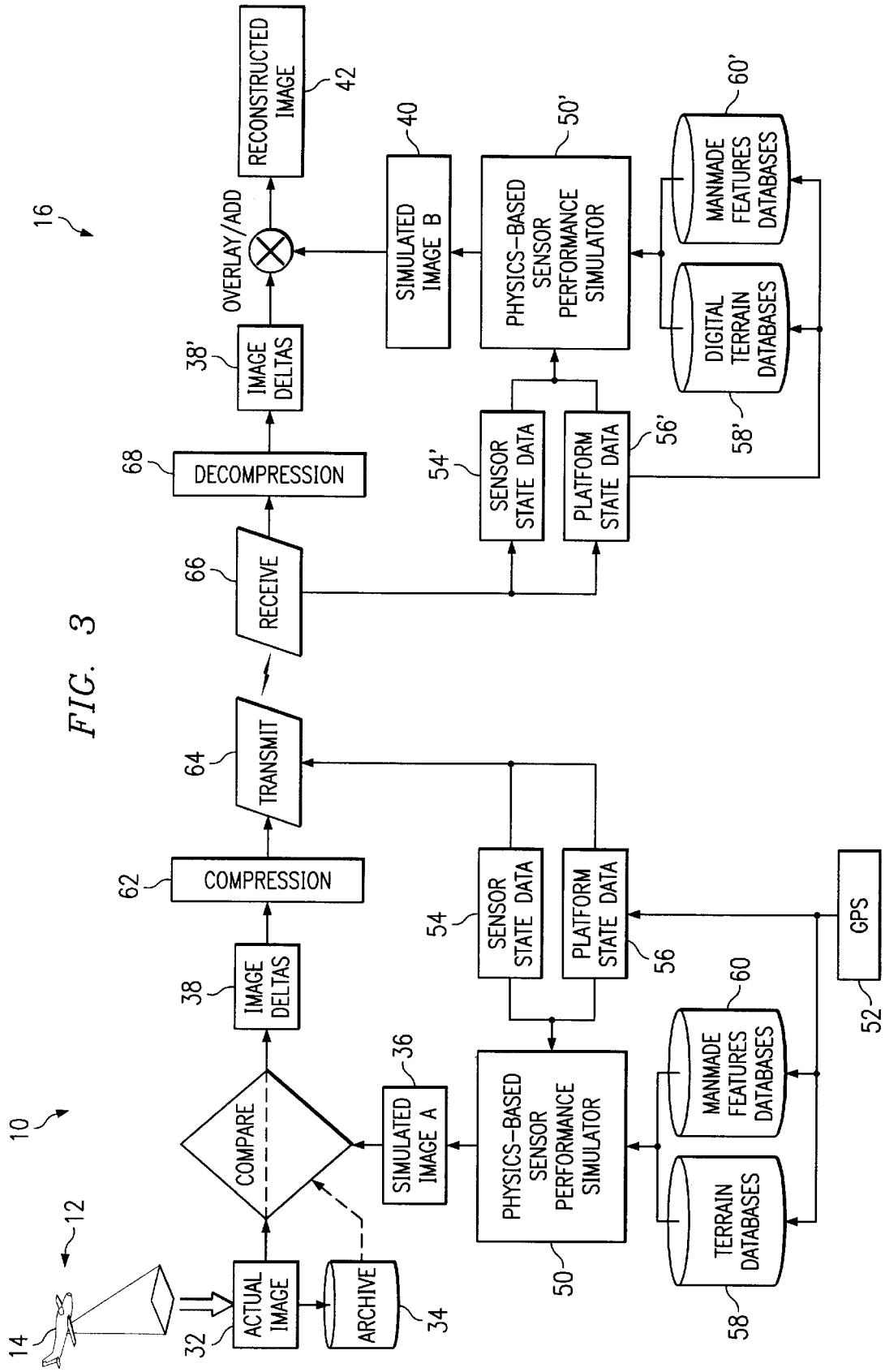
FIG. 3 is a more detailed flow diagram of an embodiment of the system and method of simulated image reconstruction according to the teachings of the present invention.

FIG. 3 is a more detailed flow diagram of an embodiment of the system and method of simulated image reconstruction 10 according to the teachings of the present invention. Imaging sensor 30 (see also FIG. 2) aboard platform 14 is used to generate an image 32 of target area 22. Actual image 32 is compared with simulated image A 36 generated by a physics-based sensor performance simulator 50 on board platform 14. Actual image 32 may also be stored in on-board image archive database 34 for later reference. Inputs to physics-based sensor performance simulator 50 include sensor state data 54, which describes the orientation of the imaging sensor 30 with respect to the moving platform 14, frequency of operation, antenna beam width, min/max range extent, min/max scan angle (or scan angle to aircraft center), radar incident angle, scan time, pulse repetition frequency (PRF), and other sensor parameters recorded at the time of actual image 32 formation. Sensor state data may be determined by current setting and orientation of the imaging sensor and some of the parameters depend on the type of imaging sensor used. For example, when using synthetic aperture radar as the imaging sensor, velocity of the platform is a more crucial factor to be considered. Another set of inputs to physics-based sensor performance simulator 50 includes platform state data 56, which may include GPS (global positioning system) location (received from GPS receiver 52), altitude, heading, velocity, pitch and roll angles, and other information related to the moving platform. In addition, platform state data may include environmental factors such as time-of-year and time-of-day and provided as input to physics-based sensor performance simulator 50. Inputs to physics-based sensor performance simulator 50 also include terrain/environmental and manmade features databases 58 and 60 which hold background or contextual content of the target area that is known or pre-existing. Databases 58 and 60 include natural and manmade features, and may be updated periodically or tailored for the region that platform 14 (i.e., aircraft) is operating. In a further embodiment of the current invention, simulated image A 36 may be compared to previously captured historical images stored in on-board image archive database 34 that share similar frames of reference. Such comparisons could facilitate image enhancement of simulated image A 36 or could be utilized to determine image deltas 38.

Physics-based sensor performance simulator 50 is preferably a dynamic, real-time simulation based on modeling the true physics of an imaging sensor onboard a moving platform. Alternatively, actual image data may be stored on-board as images are captured in image archive database 34 and then processed a posteriori to generate the image deltas for transmission to ground-based subsystem 16 if the application does not require real-time processing. Physics-based sensor performance simulator 50, as known in the art, includes software and/or hardware components (not shown) that generates a pixelized image (e.g., with radar cross section (RCS) maps) of the target area, and sensor model component that models the actual performance of the imaging sensor device. Physics-based sensor performance simulator 50 further can use a texture material mapper to generate material textures as appropriate to enhance simulated image A 36. Physics-based sensor performance simulators are typically used in flight simulation, radar and IR sensor system performance modeling, human factors research, pilot training, missile mission planning and other applications. Physics-based sensor performance simulator 50 takes into account the current environmental factors to ensure that simulated image A 36 is closely matched to the current conditions under which actual images 32 are captured. Factors such as solar thermal effects, shadows from natural and manmade light or heat sources, ground conditions, and the like can be taken into account when generating the simulated images. Examples of currently available physics-based performance simulator includes RADARWORKS developed by Photon Research Associates, Inc. of San Diego, California, and VIXSEN developed by $CG^2$ Inc. of Huntsville, Ala.

Simulated image A 36 (an example shown in FIG. 4B) is then compared with actual image 32 (an example shown in FIG. 4A) to generate image "deltas" 38 (an example shown in FIG. 4C) using an on-board comparator system. In image deltas 38, only the pixel data that did not match between the two images are saved and the rest, the known contextual content, are discarded. Therefore, image deltas 38 represent new or previously non-existing features that now occupy, either permanently or temporarily, target area 22 since features databases 58 and 60 were last updated for that geographic region of interest. The image deltas 38 thus represents the update needed that was not previously captured and/or recorded.

Figure 4A:
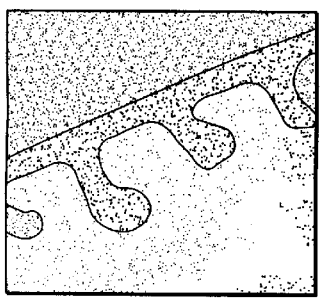
FIGS. 4A–4C are illustrative images processed on board the platform according to the teachings of the present invention.
Figure 4B:
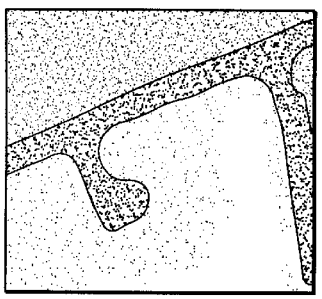
Figure 4C:
Figure 5A:
FIGS. 5A–5C are illustrative images processed at the base station according to the teachings of the present invention.
Figure 5B:
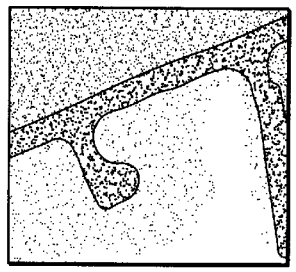
Figure 5C:

Image deltas 38 may be compressed via an available data compression technique 62 to further minimize the volume of data before being transmitted along with corresponding sensor state data 54 and platform state data 56 by an on-board transmitter 64 to a receiver 66 at base station subsystem 16. At base station subsystem 16 the received image deltas 38' (an example shown in FIG. 5A) is first decompressed 68 and then "added" to or overlaid with simulated image B 40 (an example shown in FIG. 5B) generated by a physics-based sensor performance simulator 50' resident at the base station. Physics-based performance simulator 50' uses sensor state data 54' and platform state data 56' received from platform 14 along with data from base station subsystem-maintained terrain/environmental database 58' and manmade features database 60'. Physics-based sensor performance simulator 50', terrain/environmental database 58' and manmade features database 60' are essentially identical or substantially similar to Physics-based sensor performance simulator 50, terrain/environmental database 58 and manmade features database 60 respectively, so that the simulated image B 40 is substantially identical to simulated image A 36. The resultant overlay of image deltas 38' on simulated image B 40 is a synthetically reconstructed image 42 (an example shown in FIG. 5C) that is identical or substantially similar to actual image 32 (FIG. 4A). Reconstructed image 42 can then be displayed or otherwise analyzed for reconnaissance, surveillance, or other applications.

It may be seen from the foregoing that system and method 10 take advantage of the existence of known contextual data to dramatically reduce the number of pixel data per image frame needed for transmission. This results in a significantly smaller bandwidth requirement and shorter transmit time to send the imagery data to the base station. Thus, data congestion on a given communications datalink with multiple subscribers can be reduced and other critical data needed by other platforms or users not jeopardized. The teachings herein provide an enabling technology for military and civilian applications requiring the transmission and receipt of high-resolution surveillance or reconnaissance images. Although the present invention has been described in the context of reconnaissance image gathering, other applications to collect and otherwise communicate other types of information are also contemplated to reduce the amount of information that needs to be transmitted from a remote information gathering system to another location.

What is claimed is:

1. A system comprising:
   a storage medium storing contextual information about a target;
   a simulator communicatively coupled to the storage medium, operable to receive the contextual information and generate a set of simulated information about the target using the contextual information;
   a sensor operable to collect a set of actual information about the target;
   a comparator operable to generate a set of delta information in response to a difference between the set of simulated information and the set of actual information; and
   at least one current conditions sensor operable to determine at least one measurement of current conditions at the time of actual information collection, the simulator operable to receive the at least one current condition measurement and generate the set of simulated information about the target using the contextual information and the at least one current condition measurement.

2. The system, as set forth in claim 1, wherein the storage medium, simulator, sensor and comparator are on board a moving platform.

3. The system, as set forth in claim 2, wherein the at least one current conditions sensor comprises a global positioning system receiver operable to determine a current location measurement.

4. The system, as set forth in claim 2, wherein the at least one current conditions sensor comprises sensors operable to determine current velocity and altitude of the moving platform.

5. The system, as set forth in claim 2, wherein the at least one current conditions sensor comprises sensors operable to determine current orientations of the moving platform.

6. The system, as set forth in claim 2, further comprising means for determining current orientations of the sensor.

7. A system comprising:
   a storage medium storing contextual information about a target;
   a simulator communicatively coupled to the storage medium, operable to receive the contextual information and generate a set of simulated information about the target using the contextual information;
   a sensor operable to collect a set of actual information about the target, the sensor comprising an imaging sensor operable to collect and generate actual images of a target area; and
   a comparator operable to generate a set of delta information in response to a difference between the set of simulated information and the set of actual information, wherein the simulator comprises a physics-based sensor performance simulator which emulates the capabilities of the imaging sensor.

8. The system, as set forth in claim 2, further comprising:
   a communications link transmitting the set of delta information and the at least one measurement of current conditions of the moving platform and sensor to a base station;

a second storage medium at the base station storing contextual information about the target;

a second simulator communicatively coupled to the second storage medium, operable to receive the contextual information as well as the received current condition measurements and generate a second set of simulated information about the target using the contextual information; and an adder operable to add the set of received delta information to the second set of simulated information and generate a set of reconstructed information substantially similar to the set of actual information.

9. The system, as set forth in claim 8, wherein the second storage medium is operable to store terrain/environmental and manmade feature contextual information about a target area for use by the second simulator.

10. The system, as set forth in claim 8, wherein the second simulator comprises a second physics-based sensor performance simulator.

11. The system of claim 7, wherein the storage medium, physics-based sensor performance simulator, imaging sensor and comparator are on board a moving platform.

12. The system of claim 7, further comprising a communications link operable to transmit the set of delta information to a base station.

13. An imaging system using a moving platform comprising:

an imaging sensor on board the moving platform operable to generate an actual image of a target area;

a storage medium on board the moving platform storing contextual information about the target area;

at least one current conditions sensor operable to determine at least one measurement of current conditions of the moving platform and the imaging sensor at the time of actual image generation;

a physics-based sensor performance simulator on board the moving platform communicatively coupled to the storage medium and the at least one current conditions sensor operable to generate a simulated image of the target area using the contextual information simulated performance characteristics of the imaging sensor; and a comparator operable to generate image deltas in response to a difference between the simulated image and the actual image.

14. The system, as set forth in claim 13, wherein the imaging sensor comprises an imaging radar operable to generate images of the target area.

15. The system, as set forth in claim 13, wherein the imaging sensor comprises an infrared sensor operable to generate images of the target area.

16. The system, as set forth in claim 13, wherein the sensor comprises an electro-optical sensor operable to generate images of the target area.

17. The system, as set forth in claim 13, wherein the storage medium is operable to store terrain/environmental and manmade feature contextual information about a given geographic region for use by the physics-based sensor performance simulator.

18. The system, as set forth in claim 13, wherein the at least one current conditions sensor comprises a global positioning system receiver operable to determine a current location measurement of the moving platform.

19. The system, as set forth in claim 13, wherein the at least one current conditions sensor comprises sensors operable to determine current orientations of the moving platform.

20. The system, as set forth in claim 13, wherein the at least one current conditions sensor comprises sensors operable to determine current velocity and altitude of the moving platform.

21. The system, as set forth in claim 13, wherein the at least one current conditions sensor comprises sensors operable to determine current orientations of the imaging sensor with respect to the moving platform.

22. The system, as set forth in claim 13, further comprising means for determining current orientations of the imaging sensor with respect to the moving platform.

23. The system, as set forth in claim 13, further comprising:

a communications link transmitting the image deltas and current condition measurements of the platform and imaging sensor to a base station;

a second storage medium at the base station storing contextual information about the target area;

a second physics-based sensor performance simulator communicatively coupled to the second storage medium, operable to receive the contextual information and the current condition measurements and generate a second simulated image of the target area using the contextual information; and an adder operable to add the image deltas to the second simulated image and synthesize a reconstructed image substantially similar to the actual image.

24. The system, as set forth in claim 23, wherein the second storage medium is operable to store terrain/environmental and manmade feature contextual information about the target area for use by the second physics-based sensor performance simulator.

25. The system, as set forth in claim 23, wherein the communications link is operable to transmit the at least one current condition measurement to the base station, and the second physics-based sensor performance simulator is operable to receive the current condition measurement and generate the second simulated image of the target area using the contextual information stored in the second storage medium and the received at least one current condition measurement.

26. A method, comprising:

collecting current information about a target area;

comparing the current information with previous information about the same target area;

generating delta information about the target area;

transmitting the delta information about the same target area to a remote location;

adding the delta information to previous information about the target area, and generating simulated current information about the target area at the remote location.

27. The method, as set forth in claim 26, wherein collecting current information comprises capturing a current image of the target area.

28. The method, as set forth in claim 27, further comprising generating the previous information about the target area by performing physics-based simulation of an imaging sensor used to capture the current image of the target area and generating a simulated image.

29. The method, as set forth in claim 27, further comprising generating the previous information about the target area by performing physics-based simulation of an imaging sensor on board a moving platform used to capture the current image of the target area and generating a simulated image.

30. The method, as set forth in claim 28, wherein generating delta information comprises generating image deltas in response to differences between the current image and the simulated image.

31. The method, as set forth in claim 30, wherein adding delta information to previous information comprises:

generating a second simulated image at the remote location using physics-based simulation; and overlaying the delta image with the second simulated image, and generating a simulated current image of the target area.

32. The method, as set forth in claim 29, further comprising:

determining a location, orientation, speed, and altitude of the moving platform;

determining current state information of the imaging sensor;

transmitting the moving platform location and orientation and imaging sensor current state information to the remote location; and generating a second simulated image at the remote location using the received moving platform, and imaging sensor current state information and the physics-based sensor performance simulation.

33. A method, comprising:

capturing a current image of a target area;

comparing the current image with a previous image of the same target area;

generating image deltas of the target area in response to the comparison;

transmitting the image deltas to a remote location; and adding the image deltas to the previous image of the same target area, and generating a simulated current image of the target area at the remote location.

34. The method, as set forth in claim 33, further comprising generating the previous image of the target area by performing physics-based simulation of an imaging sensor used to capture the current image of the target area and generating a simulated image.

35. The method, as set forth in claim 33, further comprising generating the previous image of the target area by performing physics-based simulation of an imaging sensor on board a moving platform used to capture the current image of the target area and generating a simulated image.

36. The method, as set forth in claim 34, wherein generating image deltas comprises generating differences between the current image and the simulated image.

37. The method, as set forth in claim 34, wherein adding the image deltas to the previous image comprises:

generating a second simulated image at the remote location using physics-based sensor performance simulation; and overlaying the image deltas with the second simulated image, and generating a simulated current image of the target area.

38. The method, as set forth in claim 33, further comprising:

determining a location, orientation, speed, and altitude of the moving platform;

determining an orientation of the imaging sensor with respect to the moving platform, and imaging sensor current state information;

transmitting the moving platform location and orientation and imaging sensor current state information to the remote location; and generating a second simulated image at the remote location using the received moving platform, and imaging sensor current state information and the physics-based sensor performance simulation.

\* \* \* \* \*